Sept. 9, 1969     K. A. BRANDENBERG     3,466,004
INTERVAL TIMER FOR PNEUMATIC LOGIC SYSTEMS
Filed July 8, 1966
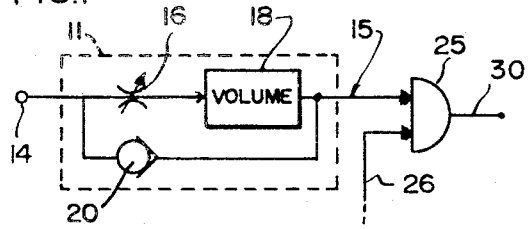
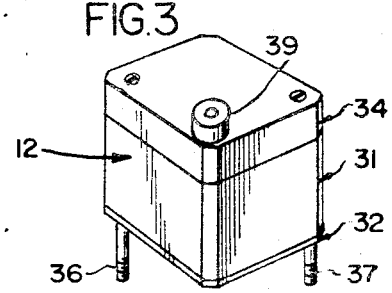
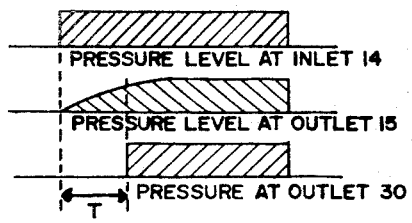
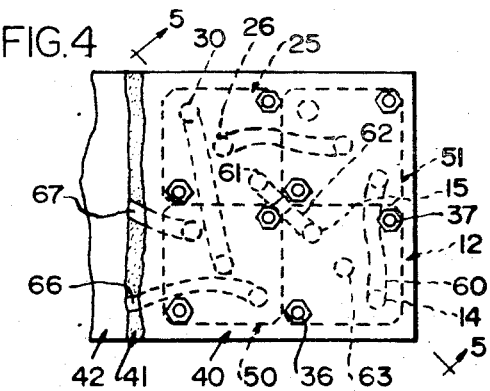
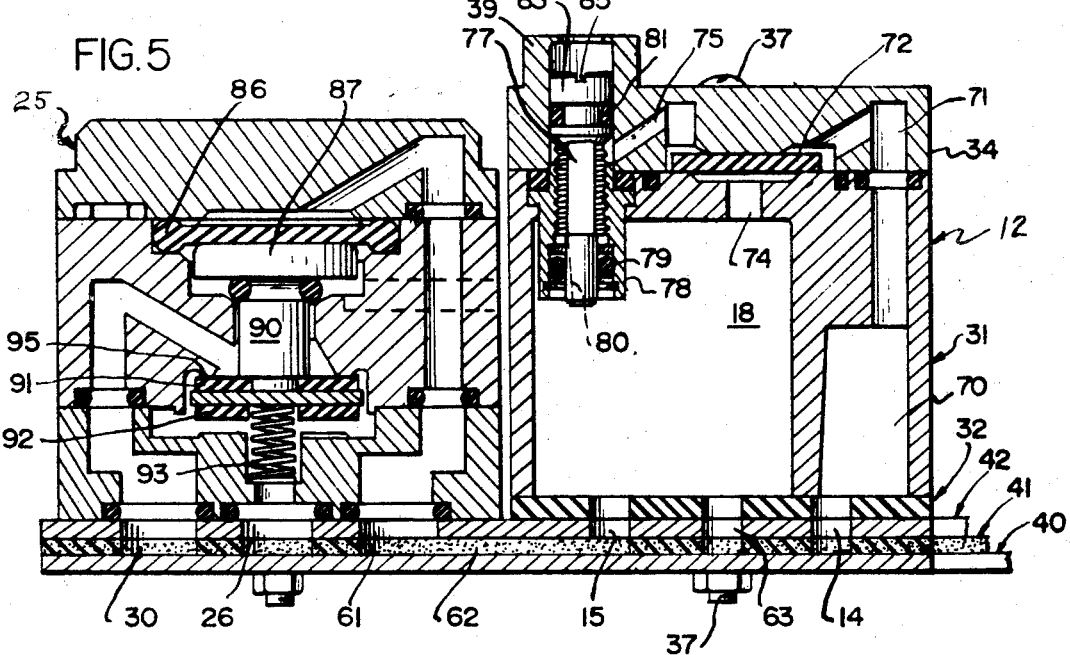
INVENTOR
KARL A. BRANDENBERG
BY Bair, Freeman & Molinare
ATTORNEYS United States Patent Office 3,466,004
Patented Sept. 9, 1969

3,466,004
INTERVAL TIMER FOR PNEUMATIC LOGIC SYSTEMS
Karl A. Brandenberg, Hayward, Calif., assignor to Aro Corporation, a corporation of Ohio
Filed July 8, 1966, Ser. No. 563,744
Int. Cl. F16k 31/165
U.S. Cl. 251—61.3                        7 Claims

ABSTRACT OF THE DISCLOSURE

A timer for a pneumatic logic system which includes a fluid inlet port, an accumulator chamber with an adjustable restricted inlet orifice in a fluid passageway from the inlet port to the chamber, an outlet port from the chamber and a valved exhaust port for the chamber. Fluid flow is provided through a unidirectional check valve in the passageway to the restricted orifice. A sufficient pressure signal is delayed to the output by operation of the orifice and chamber volume. The check valve is also in responsive communication with the exhaust port of the accumulator chamber and is adapted to exhaust the chamber when pressure in the chamber is greater than pressure at the inlet port.

---

This invention relates to pneumatic logic systems, and, more particularly, to a novel pneumatic interval timer.

In my co-pending U. S. application Ser. No. 479,758, filed on Aug. 16, 1965, a pneumatically operated control system is disclosed wherein logic functions are performed by modular "building blocks." These pressure operated logic elements are interconnected by fluid passageways defined by the base plates upon which the building blocks are mounted, eliminating the maze of tubing which would otherwise be required.

The modular, pneumatic control system disclosed in the above-mentioned application operates primarily in two-valued or "binary" logic, the two values being indicated by the presence or absence of pressure. The pneumatic logic blocks may accordingly be identified (according to their function) by the same terms which have been applied to the logic blocks in electronic digital systems, such as "AND," "OR," "NOT," and so on. A novel valve module capable of performing an "OR" function is disclosed in my co-pending U.S. application Ser. No. 513,-215, filed Dec. 13, 1965. The AND function is performed by the module described in my co-pending U.S. application Ser. No. 523,507, filed Jan. 25, 1966.

It is a general object of the present invention to provide a pneumatic interval timer.

It is a further object of the present invention to delay the leading edge of a pressure pulse.

It is a still further object of the present invention to provide a pneumatic interval timer of simple, rugged construction which is adapted for sealed mounting on a fluid circuit board.

In a principal aspect, the present invention takes the form of a pneumatic interval timer having an inlet port and an outlet port, each of which is adapted to communicate with the passageways in a fluid circuit board. The interval timer according to the present invention includes an accumulator chamber and a constricted passageway connects the inlet port to this chamber. When a pressure pulse is applied to the inlet port, fluid flow through the constricted passageway causes the pressure within the accumulator chamber to rise. According to a first feature of the invention, means are employed for adjusting the flow rate through the constricted passageway to control the rate at which pressure increases within the chamber. According to a further feature of the invention, a check valve is operatively positioned between the chamber and the inlet port for rapidly discharging the fluid from the accumulator chamber upon termination of the pressure pulse applied to the inlet port. Means are employed for communicating the pressure within the chamber to the outlet port such that the pressure level existing at the outlet provides a measure of the elapsed time following the application of the pressure pulse to the inlet port.

The interval timer according to the present invention may be used in conjunction with a pneumatic threshold device adapted for actuation at a predetermined input pressure. The input to the threshold device is connected to the outlet port of the interval timer such that the threshold device is triggered at the end of a predetermined delay interval following the application of the input pressure pulse to the timer.

These and other objects, features and advantages of the present invention may be more clearly understood through a consideration of the following detailed description. In the course of this description, reference will frequently be made to the attached drawing in which:

FIGURE 1 is a schematic diagram illustrating the basic principles of operation of the interval timer according to the present invention;

FIGURE 2 graphically illustrates the variation in pressure level with time at various points within the interval timer shown schematically in FIGURE 1;

FIGURE 3 is a perspective view showing the external details of a preferred embodiment of the invention;

FIGURE 4 is a bottom plan view looking upward at the underside of the base plates which define the passageways interconnecting various logic modules, the lower two base plate wafers broken away to show the manner in which the passageways are formed; and, FIGURE 5 is a cross-sectional view of an interval timer embodying the invention as well as an "AND" logic module, the view being taken substantially along the line 5—5 of FIGURE 4.

In the schematic drawing of FIGURE 1, the interval timer module is shown within the dotted rectangle 11 and includes an inlet port 14 and an outlet port 15. When a pressure pulse is applied to the inlet port 14, fluid flows at a measured rate through a constricted passage 16 into an accumulator chamber indicated at 18. The outlet port 15 is directly connected to the interior of chamber 18. A check valve indicated at 20 allows the passage of fluid from the chamber 18 to the inlet port 14 when the input pressure pulse is removed, but prevents fluid flow from the inlet port 14 directly to the chamber 18. Thus, the chamber 18 may be pressurized only through the constricted passageway 16. The passageway 16 includes means for adjusting the flow rate therethrough in order to control the rate at which pressure increases within the chamber 18. The interval timer 12 accordingly develops a pressure at the outlet port 15 which provides a direct measure of the elapsed time following the application of the pressure pulse to the inlet port 14.

In its most common application within a fluid logic system, the interval timer 12 shown in FIGURE 1 is used in conjunction with a threshold device such as the AND logic module described in my co-pending U.S. application Ser. No. 523,507, filed Jan. 25, 1966. Such an "AND" module is shown schematically in FIGURE 1 of the drawing at 25. One input to the "AND" module is connected to the outlet port 15 while the other input shown at 26 is adapted to receive a supply pressure. The threshold device 25 delivers an output pressure pulse to its outlet port 30 when, and only when, supply pressure is delivered to input 26 and the pressure at outlet port 15 is equal to or larger than approximately 65% of the supply pressure level.

The operation of the arrangement shown schematically at FIGURE 1 is clearly illustrated in FIGURE 2 of the drawings. The upper line of FIGURE 2 shows the pressure level existing at the inlet port 14. After the pressure pulse has been applied, the flow through constricted passageway 16 causes the pressure within the chamber 18 to increase at a substantially constant rate. After the delay interval T following the application of the pressure pulse to inlet port 14, the pressure at outlet 15 reaches a level which is sufficiently high to trigger the "AND" device 25 to produce a pressure pulse at outlet 30. It should be noted that, upon termination of the input pulse, the pressure level at outlet 15 rapidly drops due to the discharging action of the chamber 18 through the check valve 20. In consequence, pressure at outlet 30 drops at the same time.

The exterior details of an interval timer embodying the invention are clearly shown in FIGURE 3. The timer includes a central chamber housing indicated generally at 31 which is sandwiched between a base plate 32 and a cover 34. A pair of mounting studs 36 and 37 extend downwardly from diametrically opposite corners of the base plate 32. Time interval adjustments may be made by inserting an appropriate tool, such as a screw driver, through the opening provided within the annular raised section 39 of the cover 34.

The interval timer shown in FIGURE 3, as well as the other modules with which it operates in the logic system, is adapted for mounting on a fluid circuit board made up of a base plate shown generally at 40 in FIGURES 4 and 5, a gasket wafer shown generally at 41, and a cover plate indicated generally at 42.

In FIGURE 4, four modules are shown mounted on the fluid circuit board. The interval timer 12 and the "AND" module 25 are shown at the lower left and upper right respectively, and are mounted adjacent additional modules 50 and 51. Each of these four modules includes a pair of diametrically opposed mounting studs as illustrated by the studs 36 and 37 for the interval timer 12. In addition each module includes three ports aligned along the other diagonal. Communication between ports of different modules is accomplished through cutout sections of the gasket wafer 41 which form ducts as illustrated in FIGURE 4. The metallic cover plate 42 is predrilled to include an opening adjacent each port and each stud while the base plate 40 is provided with openings for the mounting studs only. The details of this novel fluid circuit board and logic module arrangement are disclosed in more detail in my co-pending U.S. application Ser. No. 479,758, filed on Aug. 16, 1965.

The inlet port 14 of interval timer 12 is connected to a port in the module 51 by means of a duct 60 cut into gasket wafer 41. Duct 60 provides the source of the input pressure pulse to the interval timer 12. The timer 12 is provided with a pair of output ports, output port 15 being connected to an inlet port 61 in the "AND" module 25 through a duct 62. Duct 62 is shown in cross-section in FIGURE 5. The central outlet port 63 of timer 12 is not connected. The input port 26, centrally located on the base plate of "AND" module 25, is connected through a duct cut in wafer 41 to a port on the module 51. The outlet port 30 of "AND" module 25 is connected to the central port of module 50. The manner in which portions of the gasket wafer 41 are cut away to provide passageways between the cover plate 42 and the base plate 40 is illustrated by the passages 66 and 67 in FIGURE 4.

The cross-sectional view of FIGURE 5 is taken substantially along the line 5—5 of FIGURE 4 and shows the interval timer module 12 and the "AND" module 25 mounted at the right and left respectively upon the fluid circuit board. From left to right, openings 30, 26, 61, 15, 63 and 14 in the cover plate 42 provide access to the ports in the bottom of the modules. The cutout passageway 62 in gasket wafer 41 communicates the outlet port 15 of the interval timer 12 to the inlet port 61 of the "AND" module 25.

Inlet port 14 communicates with an upwardly extending passageway 70 through the chamber housing section 31 to a passageway 71 in the cover 34. Pressure at the inlet port 14 is accordingly communicated to the upper surface of a flexible check disc 72 which is seated above a passageway 74. Passageway 74 communicates the lower surface of check disc 72 with the timing chamber 18. Fluid pressure at inlet port 14 is allowed to pass around the upper surface of check disc 72 to a passageway 75 to apply inlet port pressure to a region surrounding the mid-section of a metering needle indicated generally at 77. The metering needle 77 is threadably engaged with an annular retaining member 78. The retaining member 78 carries an orifice seal 79 into which the lower end of the metering needle 77 is inserted. Fluid flow is metered through a V-groove 80 whose exposed depth changes as the needle 77 is moved in relation to the orifice seal 79. A portion of the threads on needle 77 are cut away to permit flow between passageway 75 and the V-groove 80. The upper end of the metering needle 77 is retained by a seal 81 and includes a head 83 provided with a screwdriver slot 85 to facilitate timing adjustments.

As the pressure builds up in the metering chamber 18, this increasing pressure is transmitted through the outlet port 15 and the duct 62 to the inlet port 61 of the "AND" module 25. Pressure at inlet port 61 is communicated to the top of a flexible diaphragm 86, tending to force the diaphragm 86 downward against the head 87 of a valve stem shown generally at 90. The lower end of the valve stem 90 carries an outlet valve disc 91 and a stop disc 92 and is normally biased upwardly by spring 93.

Pressure at the port 26 is applied to the underside of the valve stem 90, tending to aid the spring 93 in forcing the valve stem upward. In its uppermost position, the outlet valve disc 91 seats against a circular shoulder 95 to prevent fluid flow between the inlet port 26 and the outlet port 30.

When the fluid pressure at inlet port 61 is approximately 65% of the supply pressure, the valve stem 90 is forced downward such that a fluid flow path is provided between inlet port 26 and outlet port 30. Of course, unless pressure is also applied to the inlet port 26, no pressure appears at outlet port 30. Thus, the "AND" module shown at the left in FIGURE 5 delivers pressure to the outlet port 30 only when both inlet port 26 and inlet port 61 are pressurized. It is important to note that the AND module is capable of "snap action" since, once the pressure at inlet port 61 becomes sufficient, the valve stem 90 moves downward quite rapidly.

The interval timer module according to the present invention may be applied to perform a variety of functions which may be required in a fluid logic circuit. The arrangement may be used to terminate pressure pulses as well as to initiate them by using the interval timing module in conjunction with a "NOT" module of the type described in my co-pending U.S. application Ser. No. 561,143, filed June 28, 1966.

It is to be understood that the particular embodiment of the invention which has been described is merely illustrative of one application of the principles of the invention. Numerous modifications may be made by those skilled in the art without departing from the true spirit and scope of the invention.

What is claimed is:

1. A pneumatic interval timer comprising, in combination,
    an inlet port and an outlet port,
    an accumulator chamber,
    a passageway connecting said inlet port to said chamber,
    means for adjusting the fluid flow rate through said passageway to control the rate at which pressure increases within said chamber,
    a unidirectional flow valve positioned in said passageway between said inlet port and said means for adjusting the fluid flow rate, said valve operative to allow fluid flow therethrough from said inlet port to said means for adjusting the fluid flow rate when fluid pressure at said inlet port is greater than fluid pressure in said chamber, said flow valve being in responsive communication with said chamber to sense when pressure at said inlet port is less than pressure in said chamber and exhaust said chamber, and means for communicating the pressure within said chamber to said outlet port whereby the pressure level existing at said outlet port provides a measure of elapsed time following the application of said pressure pulse to said inlet port.

2. An interval timer as set forth in claim 1 including a threshold device adapted for actuation at a predetermined input pressure and means for connecting said device to said outlet port such that said device is triggered at the end of a predetermined delay interval following the application of said pressure pulse to said inlet port.

3. An interval timer as set forth in claim 1 wherein said timer is mounted within a first housing and wherein said ports are adapted for communication with the ducts within a fluid circuit board.

4. An interval timer as set forth in claim 1 wherein said unidirectional flow valve comprises a flexible check disk having first and second opposing faces, a retaining shoulder positioned against the peripheral margin of said first face, pressure from said chamber being applied to said first face and pressure from said inlet port being applied to said second face.

5. A timer as set forth in claim 3 including a second housing having an inlet port and an outlet port, a duct in said fluid circuit board connecting said outlet port in said first housing to said inlet port in said second housing, and a pressure responsive valve mounted within said second housing for altering the pressure level at the outlet port in said second housing whenever the pressure within said chamber exceeds a predetermined value.

6. An interval timer as set forth in claim 1 wherein said valve member includes opposite pressure responsive faces, said inlet port and the passage to said means for adjusting the fluid flow rate communicating with one face and including a passage to said chamber communicating with the other face.

7. An interval timer as set forth in claim 1 including means for applying a pressure pulse to said inlet port, said timer being operative to delay said pulse to said outlet port in accordance with adjustment of said means for adjusting the fluid flow rate to said chamber.

References Cited

UNITED STATES PATENTS

| | | | |
|---|---|---|---|
| 2,760,511 | 8/1956 | Greeff | 137—624.14 X |
| 3,134,393 | 5/1964 | Kerr | 137—513.7 X |
| 3,326,237 | 6/1967 | Frick | 137—624.14 |

FOREIGN PATENTS 1,001,055  10/1951  France.

WILLIAM F. O'DEA, Primary Examiner

HOWARD M. COHN, Assistant Examiner

U.S. Cl. X.R.

137—599, 624.14, 625.27, 625.66